O. F. HOLMBERG.
EGG TURNER.
APPLICATION FILED JAN. 29, 1917.
1,270,756.
Patented June 25, 1918.
2 SHEETS—SHEET 1.
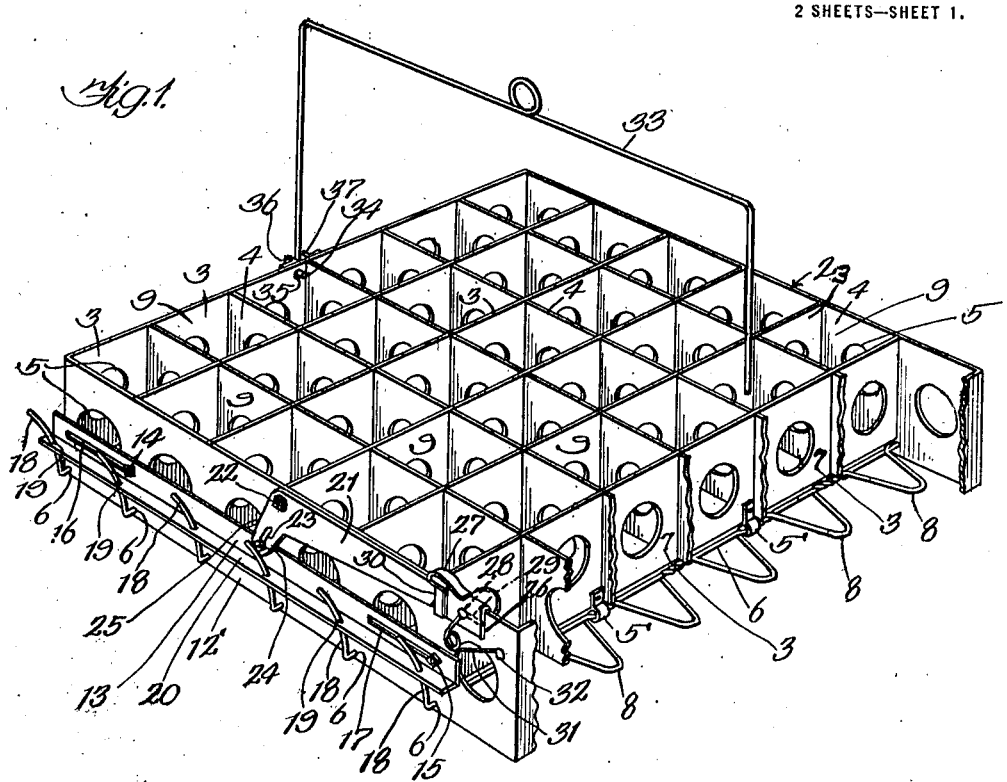
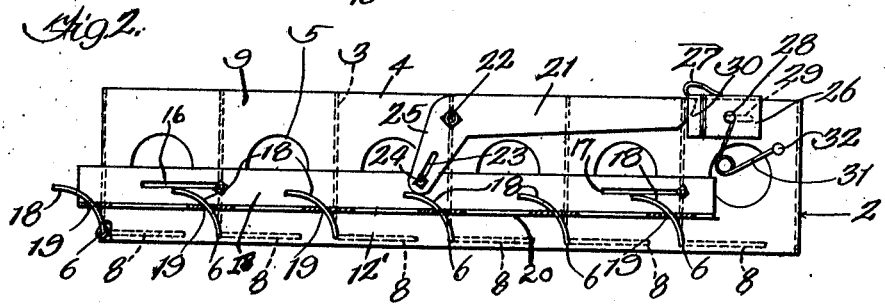
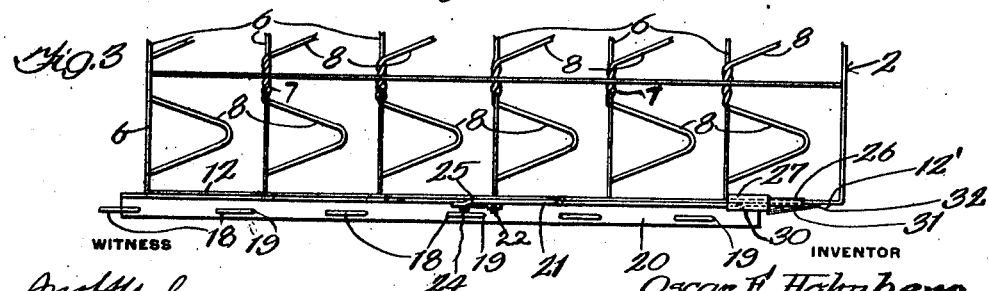
WITNESS
INVENTOR
Oscar F. Holmberg.
By
Atty.

O. F. HOLMBERG.
EGG TURNER.
APPLICATION FILED JAN. 29, 1917.
1,270,756.
Patented June 25, 1918.
2 SHEETS—SHEET 2.
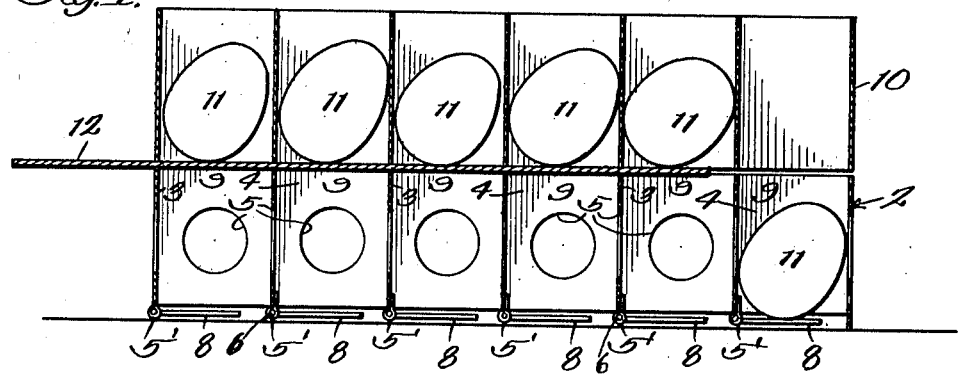
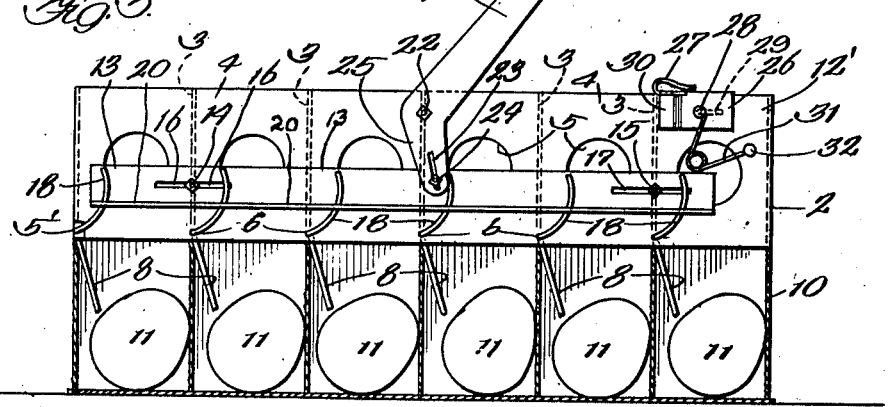
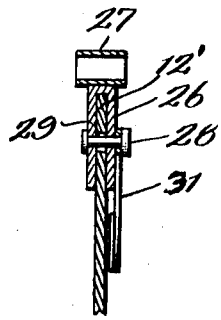
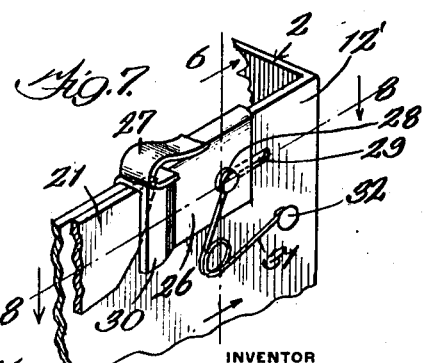
INVENTOR
Oscar F. Holmberg.

UNITED STATES PATENT OFFICE.

OSCAR FRITHIOF HOLMBERG, OF CHICAGO, ILLINOIS, ASSIGNOR OF ONE-HALF TO CHARLES TRABING, OF CHICAGO, ILLINOIS.

EGG-TURNER.

1,270,756.  Specification of Letters Patent.  Patented June 25, 1918.

Application filed January 29, 1917. Serial No. 145,135.

*To all whom it may concern:*

Be it known that I, OSCAR FRITHIOF HOLMBERG, (known as FRED HOLMBERG), a citizen of the United States, residing at Chicago, county of Cook, and State of Illinois, have invented certain new and useful Improvements in Egg-Turners, of which the following is a specification.

My invention relates to means for more expeditiously and economically handling eggs that are sterilized, or for transferring eggs from the usual egg case to the basket, receptacle or container in which eggs are carried through the sterilizing process and from which they are returned to the regular storage cases. For the treatment of eggs in large quantities temporary containers are carried on endless conveyers through a dip or tank containing the fluid by means of which the pores of the shells are closed, or the eggs sterilized. Picking the eggs by hand from the partitioned straw-board sections of an egg case into a sterilizer vessel, and replacing the eggs in their said egg case sections involves considerable labor, expenditure of time and many accidental breakages. The object of the present invention is to provide improved means for making the transfers from and back into the egg cases, whereby an entire layer, or section, of an egg case may be emptied of its contents at one operation into the temporary sterilizing container, and the latter similarly emptied into the original receptacle without manually manipulating or handling the individual eggs.

The present invention consists of the novel construction of sterilizing container, and its combinations and arrangements of parts, all as hereinafter described in detail, illustrated in the accompanying drawings, and more particularly pointed out in the appended claims.

In the drawing—

Figure 1 is a perspective view, partly broken away, of a vessel or carrier embodying my invention.

Fig. 2 is an elevation of one of the four sides of the container, showing the mechanism for releasing all of the eggs in the container into the original egg case section, at one operation.

Fig. 3 is a plan view of a section of the container.

Fig. 4 is a vertical section of the ordinary partitioned egg case section and its loose straw-board bottom mounted on a similarly partitioned container embodying my invention.

Fig. 5 is a reversal of the relative positions of containers shown in Fig. 4, showing the manner of returning the eggs to the storage case section.

Fig. 6 is a section taken substantially on the line 6—6, Fig. 7.

Fig. 7 is a perspective view of an enlarged and broken away detail portion of the container.

Fig. 8 is a section taken on line 8—8, Fig. 7.

In the several views 2 represents a metal container having substantially the same dimensions and partitionings 3 in one direction and 4 at right angles thereto, that are provided for the card-board layers of cells, or egg-case sections, of the ordinary market egg case. To lighten the structure and facilitate the circulation of sterilizing or sealing liquid throughout the compartments or egg cells, I prefer to make an opening 5 in each of the walls 3 and 4.

At suitable intervals on the lower edges of some of these walls or partitions 3 and 4, I provide loops or bearings 5' which rotatably support under each row of cells or partitions a wire 6 which is the axis of rotation for a series of open wire bottoms for the partitions, formed by coiling as at 7 another wire about the wire 6 and forming a loop 8 thereon under each egg compartment which serves as a temporary vertical support for each egg during its treatment. 9, 9 represent the compartments or cells, and 11 eggs therein. The egg case section, or layer of cells or compartments, somewhat similar to the structure 2, bears the numeral 10 and one of its loose straw-board division sheets, or bottoms, is indicated as 12. One of the four sides, separately indicated by the numeral 12', carries a mechanism for simultaneously swinging all of the bottom loops 8. In said mechanism is a longitudinally movable plate or slide 13 in which are slots 16 and 17 that are engaged by studs 14 and 15 which project from the side 12'. Each of the wires or axial rods 6 has an upwardly bent and curved lever portion 18 which passes through a bore 19 in a horizontal flange 20 formed on the slide 13. When the slide 13 is moved all of the axial wires 6 and their egg-supporting loops are rotated simultaneously. The movement of the slide 13 is controlled by a lever 21 that is fulcrumed on a stud 22 and has a downwardly curved elbow portion 25 with a slot 23 therein which engages a stud 24. The lever 21 is held in its normal position, and therewith the loops or bottoms 8 in closed or horizontal positions, by means of a U-shaped slide catch or latch 26 which straddles the upper edge of the side 12' and is held in sliding engagement therewith by a stud 28 engaging a slot 29 in the side 12'. On the latch is an outwardly bent portion 30 which spaces it from the side 12' sufficiently to form a recess into which the power end of the lever 21 may enter to be held against upward movement. The latch 26 is provided with a finger piece 27 and is held in engagement with the lever by means of a spring 31 one end of which is anchored at 32 while the other end thereof is attached to the stud 28 which slides in the slot 29. The spring is tensioned to move the catch toward the lever 21 and by pressing back the catch the weight of the eggs will swing their supporting loops 8 downwardly, swing the wire levers or arms 18 to move the slide 13 which they engage and swing upwardly the released end of the lever 21, as shown by Fig. 5. The container 2 is provided with a bail or wire handle 33 having end lugs 34 (one of which is broken away) each of which engages a hole 37 in two of the parallel sides of the container. The bail is supported in raised or operative position by a pair of lugs on the side of the container—36 and 37—the end of one of which is beveled to permit the side portions of the bail to crowd over it when the bail is folded over the edges of the container 2.

As shown in Fig. 4 all of the eggs in a section 10 are released into the container 2 by withdrawing the cardboard cover or bottom. The loops 8 afford a flexible or cushion stop which prevents breakages from the drop from the egg case section 10 into the container 2. The return of the eggs from their temporary sterilizing container 2 into the egg case section 10 is accomplished by a single movement by releasing the lever 21 as indicated in Fig. 5. In this manner the hand-picking labor of, say, two men out of three is saved, the work of sterilizing is expedited, and contact of the operator's hand with the eggs is obviated.

Having thus described my invention, I claim as new and desire to secure by Letters Patent—

1. The combination with a partitioned egg container having a cell or space for each egg, of a resilient bottom support for each said cell or space, means for supporting said supports and for releasing them to permit eggs in the container to drop by the force of gravity therefrom.

2. The combination with a partitioned sterilizing retainer having a cell therein for each individual egg, of individual bottom supports sustaining the eggs vertically in said container, and means actuated by the weight of the eggs in the container for withdrawing said supports.

3. The combination with an egg container, having a series of individual egg cells or spaces therein, of individual vertical supports for the eggs, pivot bearings on which said supports are mounted and on which said supports move between horizontal and vertical positions, and controlling means for said supports which actuate same simultaneously.

4. The combination with a container having vertical spaces therein for individual eggs, of a series of rotatable rods or wires, loops on said wires which swing to open or close the bottom ends of said spaces, lever arms on said wires, a slide engaging all of said lever arms to move same simultaneously, a lever controlling the movement of said slide, and a catch controlling the movement of said lever.

In testimony whereof I have hereunto signed my name.

OSCAR FRITHIOF HOLMBERG,
NÉE FRED HOLMBERG.